Patented Apr. 29, 1941

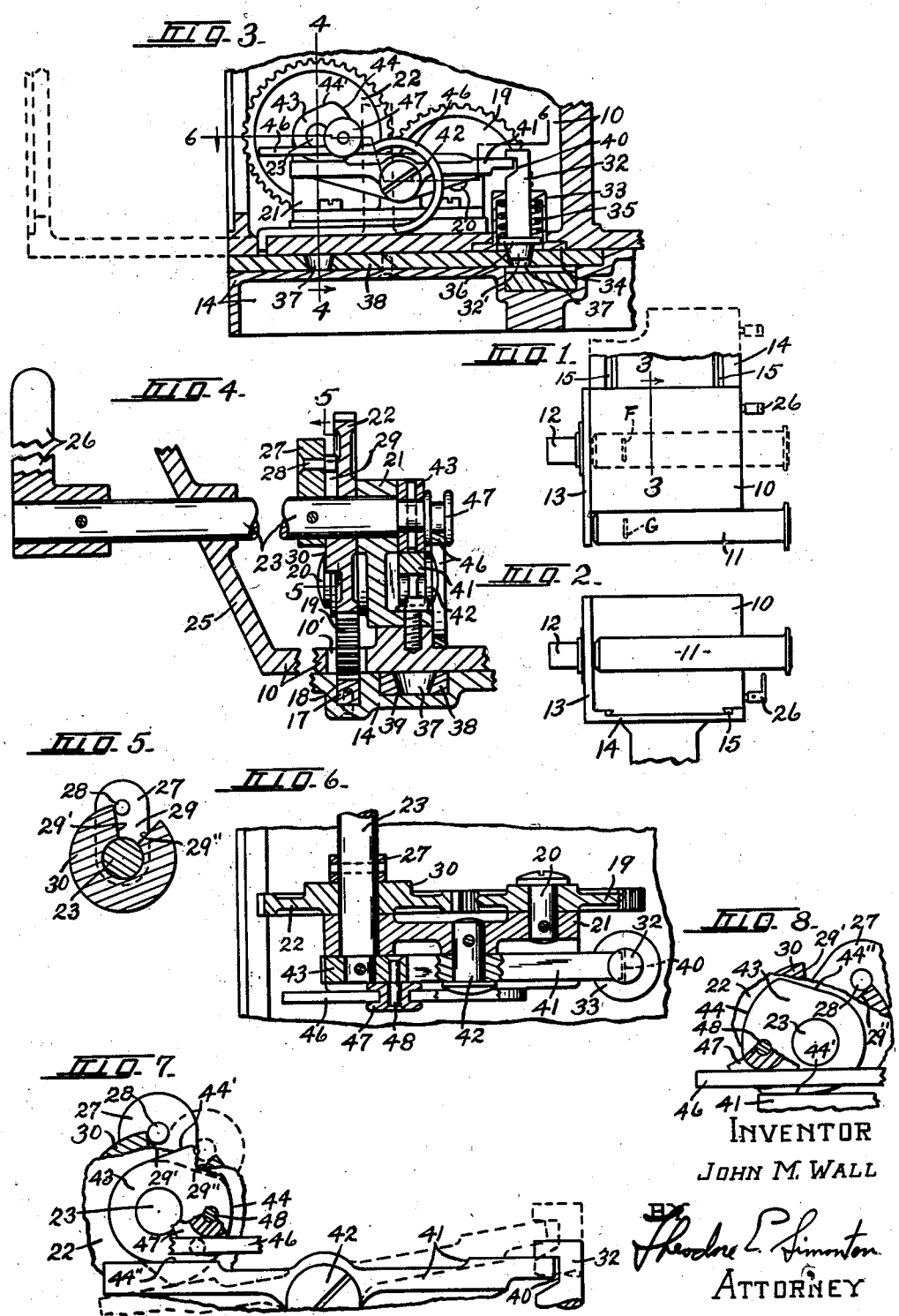

2,240,126

UNITED STATES PATENT OFFICE 2,240,126

SHIFT-OVER MECHANISM FOR CAMERAS AND THE LIKE

John M. Wall, Syracuse, N. Y.

Application March 20, 1939, Serial No. 262,862

7 Claims. (Cl. 74—91)

This invention relates to improvements in cameras and more particularly to a mechanism for shifting the camera case with respect to the photographic lens for bringing the view finder of the camera from a position at one side of the photographic lens into registration with said lens and to subsequently shift the case to return it and the view finder to their normal positions.

The main object of the invention is to produce a shift-over mechanism for cameras or the like which is economical and durable in construction and simple, accurate and positive in operation.

In carrying out the above mentioned object, I have provided a mechanism comprising cooperating operating elements associated with the camera case and the base for said case for shifting the case with respect to the base to bring the view finder of the camera into and out of registration with the photographic lens. I have also provided a simple efficient stop or holding means associated with the case and base for releasably locking the case in either of the adjusted positions thereof.

A more specific object of the invention is to provide means for actuating the operating elements and stop or holding means which includes a single manually operated control member, said control member being so connected with the operating elements and holding means that they will be successively operated by a continuous movement of the manually operated control member in one direction for shifting the camera case from one position to a second position, and when the control member is similarly moved in the opposite direction they will be operated thereby to shift the camera case back to its original position.

Other objects and advantages pertaining to the structure of the device and to the form and relation of the parts thereof will more fully appear from the following description taken in conjunction with the accompanying drawing in which:

Figure 1 is a plan view illustrating more or less diagrammatically a motion picture camera embodying the various features of this invention.

Figure 2 is a side elevation of the camera illustrated in Figure 1.

Figure 3 is an enlarged detail transverse vertical sectional view through the camera case taken substantially on line 3—3, Figure 1, illustrating my novel shift-over mechanism, the major portion thereof being illustrated in side elevation.

Figure 4 is a detail vertical sectional view taken on line 4—4, Figure 3.

Figure 5 is a detail vertical sectional view taken substantially on line 5—5, Figure 4.

Figure 6 is a detail horizontal sectional view taken substantially in the plane of the line 6—6, Figure 3.

Figure 7 is a detail side elevation illustrating on an enlarged scale the manner in which the stop or holding member is operated to release the camera case just prior to said case being moved relative to the base by a continuous movement of the manually operated control member or handle, certain portions of the mechanism being broken away and in section.

Figure 8 is a detail elevation similar to Figure 7 illustrating parts thereof in a position assumed when the camera case is moved to a second position.

In Figures 1 and 2, I have illustrated more or less diagrammatically a motion picture camera case 10 having a suitable focusing or view finder instrument 11 mounted upon the camera case 10 at one side thereof. The numeral 12 indicates a suitable photographic lens carried on a front plate 13 which is mounted on a base 14 on which the camera case 10 is transversely slidable in horizontally disposed guideways 15. The film is indicated by broken lines at F in its normal position with respect to the lens 12. G indicates, in broken lines, a ground glass mounted in the view finder 11 in such a position that it may be accurately moved into the position of film F at the rear of the photographic lens 12 so that whatever image is normally received by the film will then be received by a surface of the ground glass.

While I have stated that G is a ground glass member, it will be understood that the surface on which the image from the photographic lens may be received may be in the form of a translucent surface provided by any other suitable means than ground glass.

In Figure 1, the camera case 10 is illustrated by full lines in its normal position with the film F at the rear of the photographic lens 12 for receiving the image from the photographic lens. The camera case and view finder are illustrated by broken lines in Figure 1 as having been moved with respect to the base 14 to a second position wherein the ground glass G is positioned at the rear of the photographic lens so that whatever image would be normally received by the film will be received by the ground glass.

The shift-over mechanism comprising this invention for moving the camera case 10 with respect to the base 14 comprises a rack member 17 mounted in a groove 18 provided in the base 14 longitudinally of said base immediately beneath the camera case 10 and between the guideways 15. A pinion 19, extending through a slot 10' in case 10 and engaging with rack 17, is rotatably mounted on a stud 20 carried by a bracket 21 secured to the interior of the camera case 10. Meshing with the pinion 19 is a second pinion or gear 22 which is rotatably mounted on a shaft 23 having one end thereof journaled in the bracket 21 in spaced substantially parallel relation with the stud 20.

The shaft 23 is disposed in a substantially horizontal plane a short distance above the stud 20 and extends outwardly through a side wall 25 of the camera case and has a handle 26 secured to the outer end thereof by which the shaft may be manually rotated. Secured to the shaft 23, adjacent one side of the gear 22, is a crank arm 27 which has secured to the outer free end thereof a drive pin 28. The pin 28 projects from one side of the arm 27 into a radially disposed substantially V-shaped slot or recess 29 provided in a laterally projecting hub or flange 30 provided on the gear 22 adjacent the arm 27, as illustrated in Figures 4 and 5.

It will now be understood that when the shaft 23 is rotated, as by the handle 26, the pin 28 will engage one side or the other of the recess 29 and thereby transmit rotary motion from the shaft to the gear 22. Rotation of the gear 22 will produce a corresponding rotation of the gear or pinion 19 which in turn causes the camera case 10 to be moved longitudinally of the ways 15 as the pinion 19 travels along the rack 17.

This movement of the case 10 produced by the coaction of the rack 17 and pinion 19 is for the purpose of moving the camera case from the normal position with the film F positioned behind the photographic lens 12 to an abnormal or second position with the view finder 11 positioned behind said lens. In order that the camera case may be locked in both the normal and abnormal positions thereof, I have provided a stop or holding pin 32 which is mounted in a housing 33 provided in the case 10 in close proximity to the bracket 21 and pinion 19, as illustrated in Figures 3 and 6.

The housing 33 is an inverted cup-shaped member which, in this instance, is provided with a marginal flange 34 at the lower or open end thereof, said flange being arranged in a suitable recess provided in the lower side of the case 10 intermediate said case and the base 14. The housing 33 projects upwardly from the flange 34 through a suitable opening provided in the case 10 into the interior of said case. Mounted in the housing 33 is a spring 35 which surrounds the pin 32 and has one end thereof contacting with the upper end of the housing 33, the other end of said spring being in contact with a peripheral flange 36 provided on the pin 32 in slightly spaced relation to the lower end thereof so as to urge said pin to its lowermost position.

The lower end of the pin 32 is tapered, as at 32', and is adapted to engage in one or the other of a pair of correspondingly tapered recesses or holes 37 provided in a keeper plate 38 composed of steel or the like and which is mounted in a suitable groove or channel 39 formed in the base 14 in spaced substantially parallel relation with the rack 17. The recesses 37 are spaced from each other a distance equal to the distance the ground glass G of the view finder 11 is normally spaced from the plane passing through the center of the photographic lens 12 so that when the stop pin 32 is in engagement with one of the recesses 37, as the right-hand recess shown in Figure 3, the camera case 10 will be so positioned that the film F will be located behind the lens 12 in operative relation therewith, and when the stop pin 32 is in engagement with the other or left-hand recess 37, the ground glass G will be positioned behind the lens 12 in cooperative relation therewith.

The upper end of the stop pin 32 is provided with a notch or recess 40 which receives one end of a rock lever 41 which is disposed in substantially a horizontal plane and pivotally connected intermediate its ends to the bracket 21 by a stud 42, as illustrated in Figure 6. The opposite end of the arm from the stop pin 32 is positioned beneath the inner end of the shaft 23 in engagement with a cam 43 secured to said inner end of shaft 23. This cam member 43 is provided with an arcuate portion 44 arranged substantially concentric with the shaft 23 and two flattened portions 44' and 44'' arranged at the ends of the arcuate portion 44. The flattened portions 44' and 44'' converge inwardly from the ends of the arcuate portion 44 toward each other so that when the cam is positioned symmetrically with the horizontal plane passing through the axis of the shaft 23, a flattened portion 44' or 44'' of the cam will contact the outer or adjacent end of the lever 41.

As illustrated in Figures 3, 7 and 8, the spring 35 acting upon the end of the lever 41 engaged in recess 40 of pin 32 maintains the opposite or outer end of the rock lever in contact with the cam surface 44'.

In order that the drive pin 28 may be normally maintained in contact with one side or the other of the recess 29 when the case 10 is locked at either of its two adjusted positions and prevent easy rotation of the shaft 23 and handle 26 by movement of the pin 28 through the recess 29, I have provided a substantially U-shaped spring 46 mounted in a vertical position with one side thereof contacting with the bottom of the case 10 and the other side in engagement with a grooved roller 47 which is rotatably connected with the cam 43 by a shoulder pin 48. This pin 48 is secured to the cam 43 substantially midway between the ends of the arcuate portion 44 thereof so as to lie substantially in the horizontal plane passing through the axis of the shaft 23 when the cam 43 is in either of its two extreme positions of movement.

The operation of my novel shift-over mechanism will now be understood to be substantially as follows:

Assuming that the camera case 10 is in its normal position with the film F located at the rear of the photographic lens 12, as illustrated by full lines in Figure 1, the stop pin 32 will be in engagement with the inner disposed recess 37, as illustrated in Figures 3 and 6, for locking the case in said position. Also, the cam 43 will be facing inwardly or toward the stop pin 32 as illustrated in Figure 3.

When the cam 43 is facing inwardly, as shown in Figure 3, the drive pin 28 will be maintained by the spring 46 in contact with the left-hand side 29' of the recess 29, as illustrated in Figure 5, due to the cam 43 and arm 27 being both secured to the shaft 23 in predetermined relation with each other. When it is desired to move the camera case 10 with respect to the base 14 to bring the view finder 11 into registration with the lens 12, as indicated by broken lines in Figure 1, the handle 26 is rotated in a clockwise direction as viewed from Figure 3 so as to move the crank arm 27 and cam 43 in a corresponding direction. During the intial movement of the handle 26 and shaft 23, the pin 28 will be moved through the recess 29 from contact with the left-hand side 29' of said recess into contact with the right-hand side 29" thereof, as viewed in Figure 5. During this movement of the drive pin 28 through the recess 29, gears 22 and 19 will remain stationary and the cam 43 will be rotated in a clockwise direction a corresponding amount to bring the curved surface 44 of the cam into engagement with the adjacent end of the rock lever 41 thereby rocking said lever about the stud 42 and producing upward movement of the stop or holding pin 32, as indicated by broken lines in Figure 7. This brings the lower end 32' of the holding pin out of the keeper recess 37 and releases the case 10 with respect to the base 14. Continued rotation of the handle 26 and shaft 23 will maintain the pin 32 in its uppermost inoperative position as the curved surface 44 of cam 43 is moved along the lever 41. Also, the gear 22 will be rotated in unison with the shaft 23 due to the engagement of the pin 28 with the side 29" of the slot 29. Rotation of gear 22 will of course produce a corresponding rotation of the gear 19 and effect movement of the case 10 with respect to the base 14 as the gear 19 rolls along the rack 17.

As the case 10 approaches its outermost position, as indicated by broken lines in Figures 1 and 3, the cam surface 44 of cam 43 will pass beyond the adjacent portion of the rock lever 41 and release said lever as the flattened portion 44' of the cam registers with the rock lever. This registration of the cam surface 44' with the rock lever permits the holding pin 32 to be returned to its lowermost position by the spring 35 as said pin registers with the outermost keeper recess 37. The engagement of the holding pin with the keeper recess 38 locks the case 10 to the base 14 with the ground glass G of the view finder 11 positioned at the rear of the photographic lens 12 in registration therewith. The locking of the case 10 to the base 14 also prevents the case from being moved beyond the predetermined second position by pressure exerted on the handle 26.

When it is desired to return the case 10 to its initial position with respect to the base 14, the handle 26 and shaft 23 are rotated in the opposite direction. During the intial rotation of the handle and shaft the drive pin 28 will be moved from side 29" of the slot 29 to the opposite side 29' thereof. During this movement of the pin through the slot 29 the holding pin 32 will be moved out of registration with the outermost keeper recess 37 by the action of the cam 43 upon the lever 41 in the manner described above when moving the case to the outermost position.

As the holding pin is disengaged from the keeper 38, the gear 22 will be connected with the shaft 23 by the engagement of the pin 28 with the side 29' and produce rotation of gears 22 and 19 to return case 10 to its intial or inner position. As the case approaches its initial position the cam surface 44" of the cam 43 will again register with the lever 41 so that the holding pin 32 may be returned into engagement with the keeper recess 37 by the spring 35 when the film F of the camera case is positioned behind the photographic lens in registration therewith. It will thus be seen that the camera case may be moved from one position to a second position and at the same time be unlocked from the first position and locked in the second position by a continuous rotation of the handle 26 and shaft 23 in one direction.

When it is desired to return the case to its initial position, the unlocking, moving and locking of the case is accomplished by merely rotating the handle and shaft in the opposite direction. Furthermore, the case is automatically locked against excessive movement in either direction by the engagement of the stop or holding pin 32 with the keeper 38.

Although the construction and operation of my invention are particularly simple, practical and efficient, I do not wish to be limited to the detail of construction shown as it is evident that various changes may be made in said construction without departing from the spirit of the invention as set forth in the appended claims.

I claim:

1. In a shift-over mechanism of the character described, the combination with a driven member mounted for reciprocative movement in a predetermined path, of locking means including a movable holding element for releasably maintaining the driven member in either of two predetermined positions in said path of movement thereof, a reversible actuating shaft, means operatively connecting the shaft with the holding element whereby said holding element may be moved to release the driven member, and means operatively connecting the actuating shaft with the movable member including a gear and rack mechanism, one of the gears of said mechanism being rotatively mounted on the actuating shaft, and means including drive and driven elements providing a limited lost motion connection between the actuating shaft and said latter gear, said connecting means being of such a character that when the driven member reaches either of said positions in its path of movement said driven member will be automatically locked against further movement in either direction and the shaft will be automatically locked against further forward movement but is free to be moved in a reverse direction independently of the gear mechanism during the initial movement thereof so that the holding member may be subsequently moved by operation of the actuating shaft to release the driven member prior to movement of said latter member from said locked position thereof.

2. A shift-over mechanism of the character set forth in claim 1 having means operatively connected with the actuating shaft for yieldingly urging the same in a forward direction when said shaft is in said locked position thereof.

3. In a shift-over mechanism of the character described, the combination with a driven member mounted for reciprocative movement in a predetermined path, of locking means including a movable holding element for releasably maintaining the driven member in either of two predetermined positions in said path of movement thereof, a reversible actuating shaft, means including a cam fixed to the shaft and a rock lever operatively connecting the shaft with the holding element whereby said holding element may be moved to release the driven member, means operatively connecting the actuating shaft with the movable member including a gear and rack mechanism, one of the gears of said mechanism being rotatively mounted on the actuating shaft, means providing a pin and slot connection between the actuating shaft and said latter gear of such a nature that when the driven member reaches either of said positions in its path of movement said shaft will be automatically locked against further forward movement but is free to have an initial movement in a reverse direction independently of the gear mechanism so that the holding member may be subsequently moved by operation of the actuating shaft to release the driven member prior to movement of said latter member from said locked position thereof, and a spring operatively associated with the shaft for yieldingly urging the same in said forward direction when in said locked position thereof.

4. In a shift-over mechanism for cameras and the like, the combination with a driven member mounted for reciprocative movement in a predetermined path, of locking means including a holding element mounted to releasably maintain the driven member in either of two predetermined positions in said path of movement thereof, a primary drive mechanism including an actuating element movable in forward and reverse directions operatively connected to the holding element whereby said holding element may be moved to release the driven member, a secondary drive mechanism operatively connected to the driven member to produce said reciprocative movement thereof, and means connecting the secondary drive mechanism to the primary drive mechanism so as to be actuated by said latter mechanism including drive and driven elements of such a character that a lost motion is provided between said mechanisms during the initial portion of the movement of the actuating element in the reverse directions only so that when the driven member is locked in either of said two predetermined positions by the holding element, said actuating element is locked against farther movement in a forward direction but is free to move independently of the secondary drive mechanism in a reverse direction for producing said movement of said holding element.

5. In a shift-over mechanism for cameras and the like, the combination with a driven member mounted for reciprocative movement in a predetermined path, of locking means including a holding element mounted to releasably maintain the driven member in either of two predetermined positions in said path of movement thereof, a reversible actuating means, mechanism composed of permanently associated parts operatively connecting the actuating means with the driven member whereby said driven member may be reciprocated by said actuating means, said mechanism including drive and driven elements providing a lost motion connection between them during the initial portion of the reversing movements only of the actuating means whereby said actuating means is automatically locked against farther movement in the forward direction of movement thereof when the driven member is maintained in either of said two predetermined positions by the holding element but is free to move in the reverse directions, and means operated by the actuating means during said initial portion of said reverse movements of the actuating means for moving the holding element to release the driven member.

6. In a shift-over mechanism for cameras and the like, the combination with a driven member mounted for reciprocative movement in a predetermined path, of locking means including a holding element mounted to releasably maintain the driven member in either of two predetermined positions in said path of movement thereof, a reversible actuating shaft, a first mechanism operatively connecting the actuating shaft with the holding element whereby said holding element may be moved by said shaft to release said driven member, and a second mechanism composed of permanently related parts operatively connecting the actuating shaft to the driven member whereby said driven member may be reciprocated by said shaft, said second mechanism including coacting drive and driven elements providing lost motion between them during the initial portion of the reverse movements only of the actuating shaft whereby said shaft is maintained against farther movement in its forward direction of movement when the driven member is locked in either of said two predetermined positions by the holding element but is free to move in the reverse direction of movement thereof for actuating said holding element.

7. In a shift-over mechanism for cameras and the like, the combination with a driven member mounted for reciprocative movement in a predetermined path, of locking means including a holding element mounted to releasably maintain the driven member in either of two predetermined positions in said path of movement thereof, a reversible actuating shaft, a first mechanism operatively connecting the actuating shaft with the holding element whereby said holding element may be moved by said shaft upon reverse movements thereof to release said driven member, a second mechanism composed of permanently related parts operatively connecting the actuating shaft to the driven member whereby said driven member may be reciprocated by said shaft, both of said mechanisms including coacting drive and driven elements providing a limited lost motion between them, the drive and driven elements of said second mechanism being of such a character that the lost motion caused thereby occurs during the initial portion of the reverse movements only of the actuating shaft, the drive and driven elements of said first mechanism being of such a character that the lost motion caused thereby occurs subsequent to the lost motion caused by the drive and driven element of said second mechanism so that when the driven member reaches either of said positions in its path of movement, the actuating member is automatically locked against farther movement in the forward direction of movement thereof but is free to move in the reverse direction while said driven member is automatically maintained against farther movement in either direction of movement thereof by said holding element.

JOHN M. WALL.